Feb. 11, 1947.　　　L. J. PULS　　　2,415,532
ELECTRIC WELDING CURRENT CONTROL
Filed Sept. 16, 1943
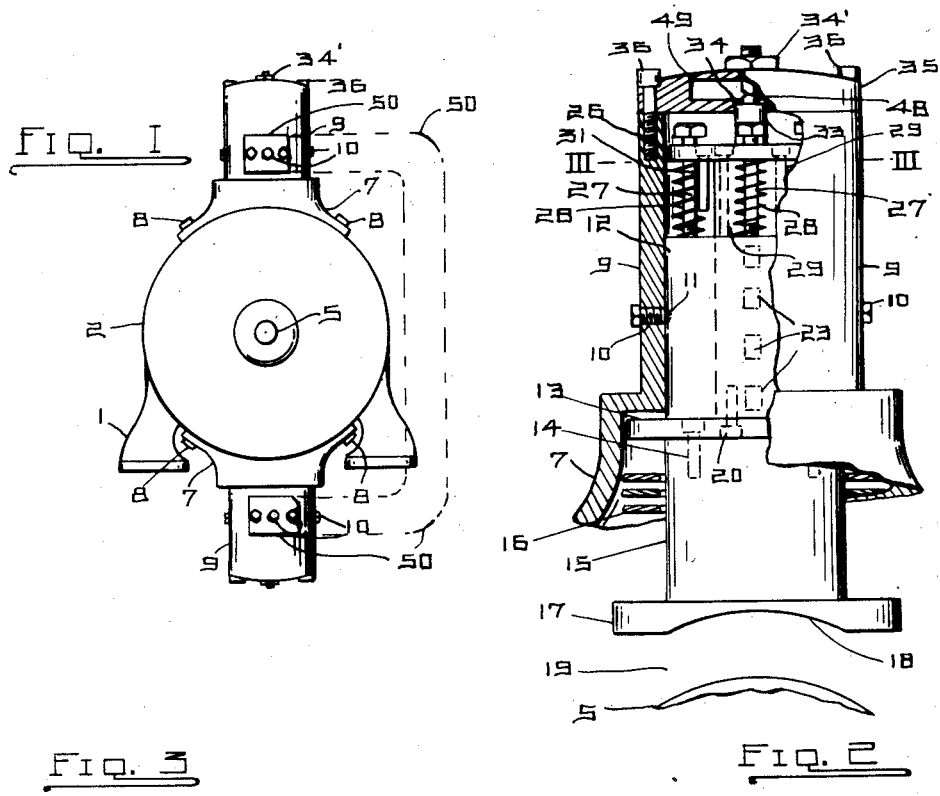
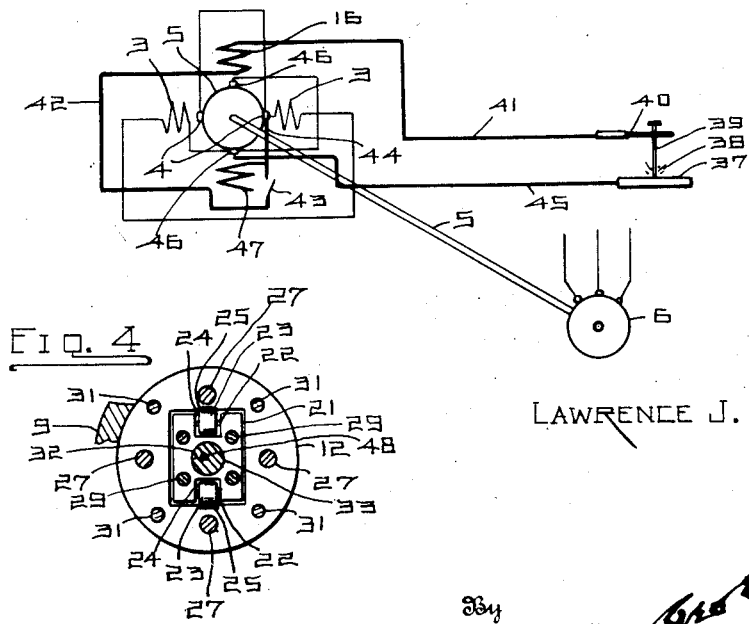
LAWRENCE J. PULS
Inventor Patented Feb. 11, 1947

2,415,532

UNITED STATES PATENT OFFICE 2,415,532

ELECTRIC WELDING CURRENT CONTROL

Lawrence J. Puls, Custar, Ohio

Application September 16, 1943, Serial No. 502,613

8 Claims. (Cl. 315—302)

This invention relates to features of control for dynamo electric machines and pertains more particularly to electric generators for direct current welding operations.

This invention has utility when incorporated in an electric current generator of the direct current type, wherein additional field winding or load coil may have its field-additional pole vary the air gap as to the rotor or armature, and thereby in association with the regular field windings, act as a control for stabilizing desired amperage generated by the apparatus. When the generator thus equipped be used in welding, the one manipulating the tool at the arc has the generating machine efficiently respond to appropriate working conditions adapted to be held or stable in practice for the special range of use.

Referring to the drawing:

Fig. 1 is an end elevation of a direct current dynamo electric machine or generator, equipped with an embodiment of the adjustable air gap field pole for load control;

Fig. 2 is an enlarged detail view, with parts broken away, showing features of this adjustable pole mounting;

Fig. 3 is an end view of the slide mounting for the adjustable pole, from the line III—III, Fig. 2; and Fig. 4 is a wiring diagram for the generator, showing the adjustable air gap pole feature, in an arc welder circuit.

A motor base 1 may mount a housing 2 for field windings 3 having brushes 4 at an armature or rotor 5 which may be actuated by a motor 6.

In accordance with the invention herein, one or more adjustable air gap pole pieces may be located, preferably between the field windings 3.

In order better to isolate the electromagnetic response, a nonmagnetic saddle or mounting piece 7 is assembled by bolts 8 with the housing 2. The saddle 7 has an integral outward tubular portion 9 thru which set screws 10 may extend to engage seats 11 in a sleeve or guide 12 thereby fixed with the auxiliary housing or extension 7, 9. A collar 13 has bolts 14 mount a laminated field pole 15 fixed therewith. This pole 15 has load coil windings 16 thereon between the collar 13 and an inner flange or shoulder 17 adjacent a concave face 18 having an adjustable air gap 19 as to the armature or rotor 5.

The collar 13 has oppositely therethru from the bolts 14, bolts 20 to engage an H-shaped slide 21 having pivot pins 22 mounting rollers 23 in position to protrude from channels 24 in the slide 21 and thereby provide anti-friction contact in grooves or tracks 25 in the fixed sleeve or guide 12. Loosely thru disk 26, extend bolts 27 terminally anchored in a fixed sleeve 12. Compression helical springs 28 about the bolts 27 yieldably space the disk 26 from the guide or sleeve 12. Additional bolts 29 rigidly connect the disk 26 with the slide 21, thereby providing a yieldable holding of the collar 13 in abutting relation with a shoulder 30 between the tubular portion 9 and the saddle 7. Stop bolts 31 fixed with the disk 26 abut the fixed sleeve 12 as the concave face 18 has its minimum air gap or is just out of contact with the rotor 5.

In practice there arises advantage, at times at least, for slowing up the shifting or any lunging of the adjustable air gap pole 15. To render sluggish or retard spasmodic action, a tubular opening 32, centrally of the slide 21 serves as a cylinder for a piston 33 having a shoulder 34 opposing an anchor connection 34' with a head 35 connected by bolts 36 with the tubular portion 9. There is accordingly, by this assembly, provided a dash pot device.

At article of work 37 there may be developed an arc 38 as from an electrode 39 mounted in a tool 40 as manipulated by the operator. From the tool 40, or rather thereto, is a conductor line 41 from a load coil or winding 16, circuit to which is by way of a line 42 past a switch 43 and line 44 to the normally rotor-contacting brush 4. The circuit as to the work 37 has a ground or conductor line 45 to a brush 46 at the rotor 5 and normally contacting such rotor 5 as does the brush 4. These brushes 4, 46, may be the brushes for the normal or usual generator operation in their connection with the normal or relatively high resistance field windings 3. In practice, applicant's experience has been that the adjustable air gap pole 15 may be a single, say in a two pole machine as to the normal or fixed poles. However, should there be purpose to have a more mechanically as well electrically balanced structure, the switch 43 may be swung from closing with the line 44, to connect in the load circuit, a coil winding 47 similar to the winding 16. This winding 47 has the field winding 3 between it and the winding 16.

Applicant has found that by properly selecting or adjusting the springs 28 there is possible non-oscillatory, but smooth functioning of the generator, contributing to proper welding operation in stable current output. It is usual in starting up to require a higher voltage in striking the arc 38. As such arc 38 is developed, say with a $\frac{1}{16}$" diameter electrode 39, a welding current of 25 to 30 amperes may be the generator output.

This low current strength has not reduced the air gap 19 very materially from the maximum as determined by the springs 28. When the operator is using an electrode 39 of 1/8" or say 5/32", the current may have an amperage in the range of 150, and the air gap which may have been around 1" at 25 to 30 amperes, is now reduced to 5/8" or even to 1/2". With the machine to develop 300 amperes, the air gap 19 drops to about 1/8" and this operation is developed by the operator when using the electrode 39 of 1/4" stock.

From the foregoing it is to be understood that the generator has its four brushes 4, 46, and its field windings 3. The control added feature hereunder involves a movable pole 15, 17, with its low resistance or load circuit series winding 16, as a unit shiftable toward the rotor or armature 5, as the energization provides a source which increases the magnetic flux to overcome the opposition of the compression helical spring means 28. Furthermore, there may be desirably, a retarding action of the dashpot, which as oil or hydraulic, has an adjusted size leakage port 48 longitudinally thru the piston 33 as a communication between the chamber or cylinder 32 toward the rotor 5, and a chamber 49 in the head 35. As so assembled, there is achieved a smooth control which permits the operator so to hold the electrode that it responds for more or less heat at the arc as the working conditions require. The closer placing, or shorter arc means more current is available. The gradual movement of the control pole 15 works out in practice against troubles from sputtering, and a smooth clean weld joint is readily had.

The experience has been that the flux control by the movable pole is simple and works out satisfactorily for but one movable pole, and that above. The action seems to be analogous to that of a bar magnet, instead of a horseshoe magnet. For such a horseshoe magnetic circuit, the magnetism responsive means or iron sleeve 12 may have a connection thru additional bolts 10 to assemble an iron or magnetism responsive connector or spanner 50 between the bolts 10 of different portions 9.

What is claimed and it is desired to secure by Letters Patent is:

1. For a welding electrode current control, a direct current electric generator having a rotor, said control comprising a load circuit, a welding electrode remote from the generator and in said circuit adapted to be manually shifted to vary current flow response from the generator, a coil at all times in said circuit, a first pole for the generator energized by said coil, and mounting means for the pole in the generator to vary the air gap between the rotor and the pole, there being magnetic flux actuating means effective from the load circuit thru said coil to shift the pole relatively to the mounting means and toward the rotor of the generator upon current flow increase in the coil responsive to manual shifting of the operator-handled welding electrode whereby reaction thru the flux to the pole positions the pole to stabilize the ampere output of the load circuit.

2. An electric current generator having a rotor, field poles and an intermediate relatively movable field pole for the generator, a load circuit winding on the movable pole having a source of magnetic flux from the load circuit series winding current providing control means effective for varying the movable pole air gap as to the rotor of the generator, a load circuit from the winding, and a manually-shiftable welding electrode in the circuit operative to modify the load demand on the circuit for the control means to position the movable pole responsively in stabilizing the welding current at the electrode.

3. For a welding electrode current control, a direct current electric generator having field poles and a rotor, said welding electrode control for current output of the generator comprising a load circuit coil in circuit with the electrode, an additional relatively movable field pole for the generator intermediate the other field poles, there being a source of magnetic flux responsive to the load circuit coil providing actuating means to vary the air gap between the intermediate pole and the rotor of the generator.

4. A control for a direct current operator-handled welding electrode having a circuit therefrom, and in said circuit an electric generator remote from the electrode, said generator having field poles and a rotor, said control comprising an additional field pole for the generator intermediate a pair of the other field poles, mounting means providing normally holding the additional pole spaced from the rotor of the generator, and a load circuit winding for the additional pole having a source of magnetic flux from the winding for the additional pole providing control means to oppose the holding operation of the mounting means and thereby reduce the air gap between the additional pole and the rotor of the generator in response to control from the operator-handled welding electrode.

5. A welding electrode providing a stabilized control for a relatively remote direct current electric generator having field poles and a rotor, said control comprising an additional field pole intermediate a pair of the other field poles of the generator, spring means normally holding the additional pole spaced from the rotor of the generator, dashpot means to slow up shifting of the additional pole, and, in circuit from the electrode, a load circuit coil for the additional pole having a source of magnetic flux from said load circuit coil providing control means effective to shift the additional pole toward the rotor of the generator against the action of the spring means, responsive to manipulation of the operator-handled welding electrode in modifying the position of the additional pole as to the rotor.

6. The method of arc welding comprising the steps of establishing a load current, and rendering the load circuit responsive to welding demand by effecting variations in magnetic flux therefrom arising from manipulating a welding electrode to cause the air gap between an intermediate field pole of the generator and the rotor of the generator to be changed by the variations.

7. An arc welding electrode, a load circuit therefor, a winding in said circuit, a generator for the circuit remote from the electrode, said generator having a rotor and a relatively movable field pole provided with a winding in the load circuit providing magnetic flux control means to actuate the pole toward the rotor of the generator responsive to manipulation of the operator-handled welding electrode in stabilizing the welding current circuit, and yieldable mounting means resisting pole movement toward the rotor of the generator.

8. A welding electrode, and a circuit therefrom to a generator output control device responsive to electrode manipulation for stabilizing the current of the welding circuit, comprising an output circuit coil, a laminated field pole adapted to produce a source of magnetic flux from the coil, a non-magnetic member for mounting at the generator, a rotor for the generator, and guide means in the member for directing pole movement toward and from the rotor of the generator in response to magnetic flux actuation of the pole as to the guide means energized by the coil.

LAWRENCE J. PULS.

REFERENCES CITED

The following references are of record in the file of this patent:

UNITED STATES PATENTS

| Number | Name | Date |
|---|---|---|
| 682,642 | Sachs | Sept. 17, 1901 |
| 2,163,418 | Tisza | June 20, 1939 |
| 1,442,050 | Creveling | Jan. 16, 1923 |
| 1,900,277 | Creveling | Mar. 7, 1933 |
| 263,134 | Edison | Aug. 22, 1882 |
| 2,102,761 | Strobel | Dec. 21, 1937 |
| 859,826 | Martinka | July 9, 1907 |